(12) United States Patent
Ouzts et al.

(10) Patent No.: US 9,818,215 B2
(45) Date of Patent: *Nov. 14, 2017

(54) SPECULAR HIGHLIGHTS ON PHOTOS OF OBJECTS

(71) Applicant: eBay Inc., San Jose, CA (US)

(72) Inventors: Todd Lane Ouzts, Portland, OR (US); Monroe Williams, Happy Valley, OR (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/468,761

(22) Filed: Mar. 24, 2017

(65) Prior Publication Data

US 2017/0200298 A1  Jul. 13, 2017

Related U.S. Application Data

(63) Continuation of application No. 14/260,091, filed on Apr. 23, 2014, now Pat. No. 9,607,411.

(51) Int. Cl.
*G06T 11/00* (2006.01)
*G06T 11/60* (2006.01)

(52) U.S. Cl.
CPC ............ *G06T 11/60* (2013.01); *G06T 11/001* (2013.01); *G06T 11/00* (2013.01)

(58) Field of Classification Search
None
See application file for complete search history.

(56) References Cited

U.S. PATENT DOCUMENTS

| 8,184,143 B2 | 5/2012 | Garcia |
| 8,593,485 B1 | 11/2013 | Anguelov et al. |
| 8,847,951 B1 | 9/2014 | Anguelov et al. |
| 9,607,411 B2 | 3/2017 | Ouzts et al. |
| 2003/0137506 A1 | 7/2003 | Efran et al. |

(Continued)

FOREIGN PATENT DOCUMENTS

| CN | 106462769 A | 2/2017 |
| WO | WO-2015164395 A1 | 10/2015 |

OTHER PUBLICATIONS

"U.S. Appl. No. 14/260,091, Final Office Action dated Jul. 18, 2016", 17 pgs.

(Continued)

*Primary Examiner* — Mark Zimmerman
*Assistant Examiner* — Yu-Jang Tswei
(74) *Attorney, Agent, or Firm* — Schwegman Lundberg & Woessner, P.A.

(57) ABSTRACT

Systems and methods are presented for recording and viewing images of objects with specular highlights. In some embodiments, a computer-implemented method may include accessing a first plurality of images, each of the images in the first plurality of images including an object recorded from a first position, and a reflection of light on the object from a light source located at a different location than in each of the other images in the first plurality of images. The method may also include generating a first composite image of the object, the first composite image comprising a superposition of the first plurality of images, and wherein each of the images in the first plurality of images is configured to change in a degree of transparency within the first composite image and in accordance with a first input based on a degree of tilt.

19 Claims, 13 Drawing Sheets

(56) References Cited

U.S. PATENT DOCUMENTS

| | | |
|---|---|---|
| 2011/0102615 A1 | 5/2011 | La Lumondiere et al. |
| 2011/0286682 A1 | 11/2011 | Banner et al. |
| 2012/0099194 A1 | 4/2012 | Verschuren |
| 2012/0101790 A1 | 4/2012 | Hsu et al. |
| 2013/0057574 A1 | 3/2013 | Shimizu et al. |
| 2013/0230243 A1 | 9/2013 | Intwala et al. |
| 2013/0257848 A1 | 10/2013 | Westerinen et al. |
| 2013/0335437 A1 | 12/2013 | Lynn et al. |
| 2014/0005484 A1 | 1/2014 | Charles |
| 2015/0310635 A1 | 10/2015 | Ouzts et al. |

OTHER PUBLICATIONS

"U.S. Appl. No. 14/260,091, Non Final Office Action dated Jan. 5, 2016", 18 pgs.

"U.S. Appl. No. 14/260,091, Notice of Allowance dated Nov. 15, 2016", 7 pgs.

"U.S. Appl. No. 14/260,091, Response filed Apr. 5, 2016 to Non Final Office Action dated Jan. 5, 2016", 12 pgs.

"U.S. Appl. No. 14/260,091, Response filed Oct. 18, 2016 to Final Office Action dated Jul. 18, 2016", 9 pgs.

"International Application Serial No. PCT/US2015/026908, International Preliminary Report on Patentability dated Nov. 3, 2016", 7 pgs.

"International Application Serial No. PCT/US2015/026908, International Search Report dated Jul. 31, 2015", 2 pgs.

"International Application Serial No. PCT/US2015/026908, Written Opinion dated Jul. 31, 2015", 5 pgs.

Pavlidis, George, et al., "Methods for 3D digitization of Cultural Heritage", (2006), 6 pgs.

"Korean Application Serial No. 2016-7032550, Office Action dated Jul. 27, 2017", w/English Translation, 7 pgs.

SPECULAR HIGHLIGHTS ON PHOTOS OF OBJECTS

CLAIM OF PRIORITY

This application is a continuation of and claims the benefit of priority to U.S. application Ser. No. 14/260,091, filed Apr. 23, 2014, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2013, eBay Inc. All Rights Reserved.

TECHNICAL FIELD

The subject matter disclosed herein generally relates to enhancing digital images. In some example embodiments, the present disclosures relate to systems and methods for specular highlights on photos of objects.

BACKGROUND

In the digital age, recording digital images of objects has become vastly more commonplace. Many uses are available for recording and displaying digital images, including posting retail products online, sharing pictures of presents and gifts to friends and family, supplementing journalistic articles with pictures, and presenting images for research purposes. As recording and displaying digital images become ever more commonplace, the desire to improve the capturing of real life images increases.

BRIEF DESCRIPTION OF THE DRAWINGS

Some embodiments are illustrated by way of example and not limitation in the figures of the accompanying drawings.

DETAILED DESCRIPTION

Figure 1:
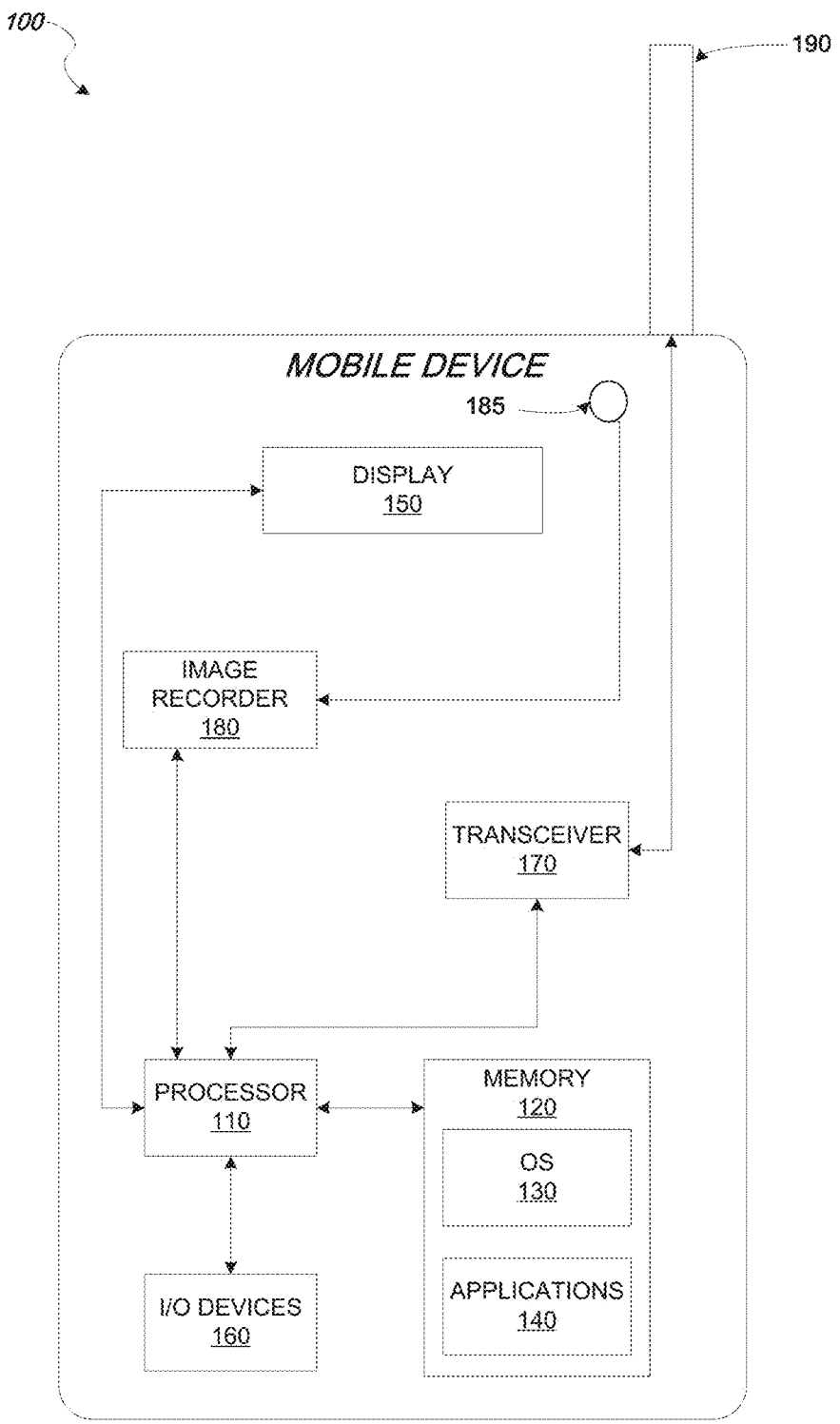
FIG. 1 is a mobile device suitable for recording images of an object, and for generating and/or viewing a composite image based on the recorded images, according to some example embodiments.

Example methods, apparatuses and systems are presented for generating and viewing images of objects with specular highlights. In some example embodiments, the images can display changing specular properties based on motion control of the display device displaying the image.

As digital images become more commonplace, it is desirable to improve the presentation of real life objects through digital means. In general, there is a desire to represent real life objects and environments in as real a depiction through digital means as possible. However, some types of objects have been more difficult to effectively capture and display than others. In particular, as examples, objects that possess at least some reflective or specular properties, such as polished gemstones, crystal vases, jewelry, glossy plastic objects, etc., tend not to be captured well in pictures because the reflective brilliance of those objects cannot be fully expressed through just a static picture alone. For example, a viewer may be unable to fully appreciate with just a single static image a gemstone with many reflective angles. In general, objects with specular or reflective properties where light reflects off the object in many different directions tend to lose their luster or brilliance when attempted to be displayed in a single digital image.

Transitioning to online displays and showrooms can thus be difficult for certain businesses or industries. For example, jewelry retailers and designers have a difficult time conveying the best facets of their products when trying to advertise online. As more products and businesses rely on online shopping and sales, current means for displaying goods online may be inadequate for some, and as a result these businesses or industries may lose customers and/or sales. It is therefore desirable to improve means for recording and viewing objects digitally, and in particular recording and viewing objects with reflective or specular properties. These problems and more may be solved by the following disclosures.

Aspects of the present disclosure discuss methods and systems for recording and viewing images of objects with specular highlights. In some example embodiments, the digital image of an object may be "tilted" from various angles, and light reflecting off the object may vary in accordance with the tilt of the image. In some example embodiments, while to the viewer it may appear that there is just a single image of the object presented on a display screen, the image of the object may actually be a composite blend of multiple images of the same object, but with at least one light source shining on the object from different angles in each of the multiple images. Depending on the viewing angle of the composite image by the viewer, based on a tilt vector measured by one or more gyroscopes and/or accelerometers in the display device, for example, some of these multiple images may be made completely transparent, so that they are not viewable based on said viewing angle, while one or more of the multiple images may be made more opaque, thus generating a sort of blended image of the object that displays a certain angle of light reflecting off the object. A more detailed description will be presented herein, in accordance with the figures of the present disclosures.

Referring to FIG. 1, a block diagram illustrating a mobile device 100 is presented, according to some example embodiments. The mobile device 100 may be configured to record images of objects with specular highlights, as well as view images according to at least some example embodiments. The mobile device 100 may be configured to record images of an object, with each image have a light source directed at an object from different angles. For example, camera lens 185 may be configured to receive image data, which may be used by an image recorder 180 to record images of an object, the camera lens 185 being controlled by image recorder 180. The mobile device 100 may alternatively or additionally be configured to view a composite image of the object, the composite image showing various angles of light directed on the object in accordance with a tilt vector. For example, display 150 may be configured to display the multiple images and/or the composite image according to some example embodiments. The mobile device 100 may include a processor 110. The processor 110 may be any of a variety of different types of commercially available processors suitable for mobile devices (e.g., an XScale architecture microprocessor, a Microprocessor without Interlocked Pipeline Stages (MIPS) architecture processor, or another type of processor). The processor 110 may be configured to combine the multiple images of the object into a composite image according to some example embodiments. A memory 120, such as a random access memory (RAM), a Flash memory, or other type of memory, is typically accessible to the processor. The memory 120 may be adapted to store an operating system (OS) 130, as well as application programs 140, such as a mobile application for generating a composite image of an object using the multiple images, and/or a mobile application for viewing the composite image. The processor 110 may be coupled, either directly or via appropriate intermediary hardware, to a display 150 and to one or more input/output (I/O) devices 160, such as a keypad, a touch panel sensor, a microphone, and the like. Similarly, in some embodiments, the processor 110 may be coupled to a transceiver 170 that interfaces with an antenna 190. The transceiver 170 may be configured to both transmit and receive cellular network signals, wireless data signals, or other types of signals via the antenna 190, depending on the nature of the mobile device 100. In this manner, a connection with a network such as network 204 of FIG. 2, discussed more below, may be established. Mobile device 100 may also include one or more means for obtaining a 3-dimensional orientation of the mobile device 100. For example, one or more gyroscopes and/or accelerometers, not shown, may be built into the mobile device, the gyroscopes and/or accelerometers configured to determine a degree of tilt of the mobile device 100 from a vertical and/or horizontal plane.

Figure 2:
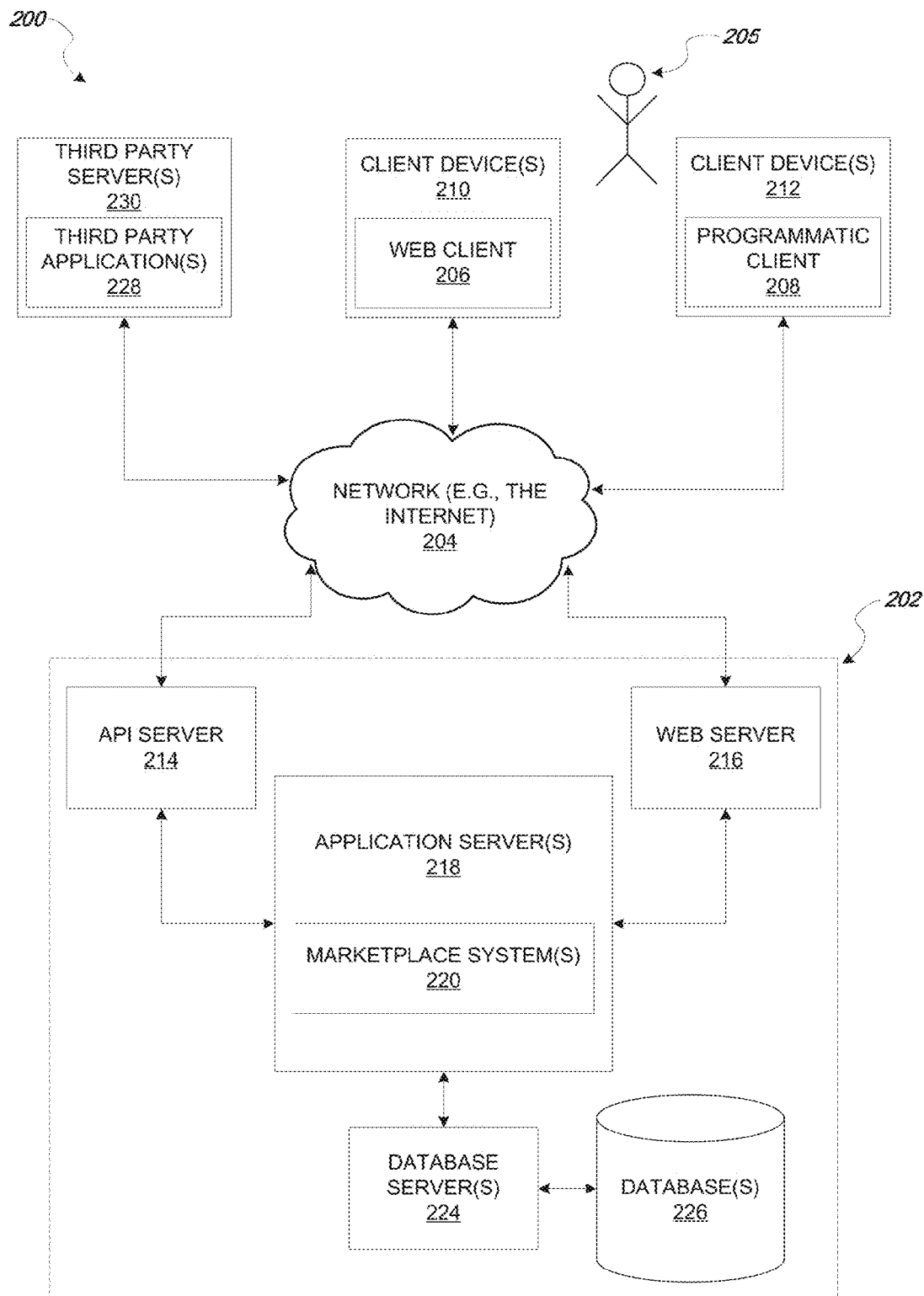
FIG. 2 is a network architecture suitable for storing images of an object, and for generating and/or transmitting a composite image based on the recorded images, according to some example embodiments.

Referring to FIG. 2, a high-level client-server-based network architecture 200 is shown, according to some example embodiments. The network architecture 200 may include systems, applications, modules, and/or other means for utilizing aspects of the present disclosures, as may be apparent to those with skill in the art. For example, the network architecture 200 may include means for accessing a plurality of images of an object, and for generating a composite image based on the plurality of images and according to aspects of the present disclosure. The network architecture 200 may also be configured to transmit the composite image to one or more viewers. In some example embodiments, a networked system 202 may facilitate a network-based marketplace or payment system 220, providing server-side functionality via a network 204 (e.g., the Internet or wide area network (WAN)) to one or more client devices 210 and 212. FIG. 2 illustrates, for example, a web client 206 (e.g., a browser, such as the Internet Explorer® browser developed by Microsoft®), and a programmatic client 208 executing on respective client devices 210 and 212. The network-based marketplace system 220 may include a website or other central repository for storing and displaying the composite images. The images may, for example, be used as advertisements or depictions of products for sale in the marketplace system 220.

Examples of client devices 210 and 212 may include, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 202. Example client devices 210 and 212 may be consistent with the mobile device 100 described in FIG. 1. In some embodiments, the client device 210 and/or 212 may comprise a display module (not shown) to display information (e.g., in the form of user interfaces) and images. In further embodiments, the client device 210 and/or 212 may comprise one or more of touch screens, accelerometers, gyroscopes, cameras, microphones, global positioning system (GPS) devices, and so forth. In some examples embodiments, the networked system 202 is a network-based marketplace that responds to requests for product listings, publishes publications comprising item listings of products available on the network-based marketplace, and manages payments for these marketplace transactions. The product listings may include one or more images of the one or more various products. The images may include one or more composite images of a product as described herein. One or more users 205 may be a person, a machine, or other means of interacting with client devices 210 and 212. In embodiments, the user 205 is not part of the network architecture 200, but may interact with the network architecture 200 via client devices 210 and 212 or another means.

An application program interface (API) server 214 and a web server 216 are coupled to, and provide programmatic and web interfaces respectively to, one or more application servers 218. The application servers 218 may host one or more marketplace systems 220, which may comprise one or more modules or applications and which may be embodied as hardware, software, firmware, or any combination thereof. The application servers 218 are, in turn, shown to be coupled to one or more database servers 224 that facilitate access to one or more information storage repositories or database(s) 226. In some example embodiments, the databases 226 are storage devices that store information to be posted (e.g., publications or listings, images of products, etc.) to the marketplace system 220. The databases 226 may also store digital goods information in accordance with example embodiments.

The marketplace system(s) 220 may provide a number of marketplace functions and services to users 205 that access the networked system 202. While the marketplace system(s) 220 is shown in FIG. 2 to form part of the networked system 202, it will be appreciated that, in alternative embodiments, the system 220 may form part of a payment service that is separate and distinct from the networked system 202.

Further, while the client-server-based network architecture 200 shown in FIG. 2 employs a client-server architecture, the present inventive subject matter is of course not limited to such an architecture, and may equally well find application in a distributed, or peer-to-peer, architecture system, for example. The various marketplace system(s) 220 may also be implemented as standalone software programs, which do not necessarily have networking capabilities.

The web client 206 accesses the various marketplace system(s) 220 via the web interface supported by the web server 216. Similarly, the programmatic client 208 accesses the various services and functions provided by the marketplace system(s) 220 via the programmatic interface provided by the API server 214. The programmatic client 208 may, for example, be a seller application (e.g., the Turbo Lister application developed by eBay® Inc.) to enable sellers to author and manage listings on the networked system 202 in an off-line manner, and to perform batch-mode communications between the programmatic client 208 and the networked system 202.

Additionally, a third party application(s) 228, executing on a third party server(s) 230, is shown as having programmatic access to the networked system 202 via the programmatic interface provided by the API server 214. For example, the third party application 228, utilizing information retrieved from the networked system 202, may support one or more features or functions on a website hosted by the third party. The third party website may, for example, provide one or more promotional, marketplace, or payment functions that are supported by the relevant applications of the networked system 202. The third party server 230 may help proliferate the display of the composite images according to the present disclosures through, for example, advertising a product shown in a composite image.

Figure 3:
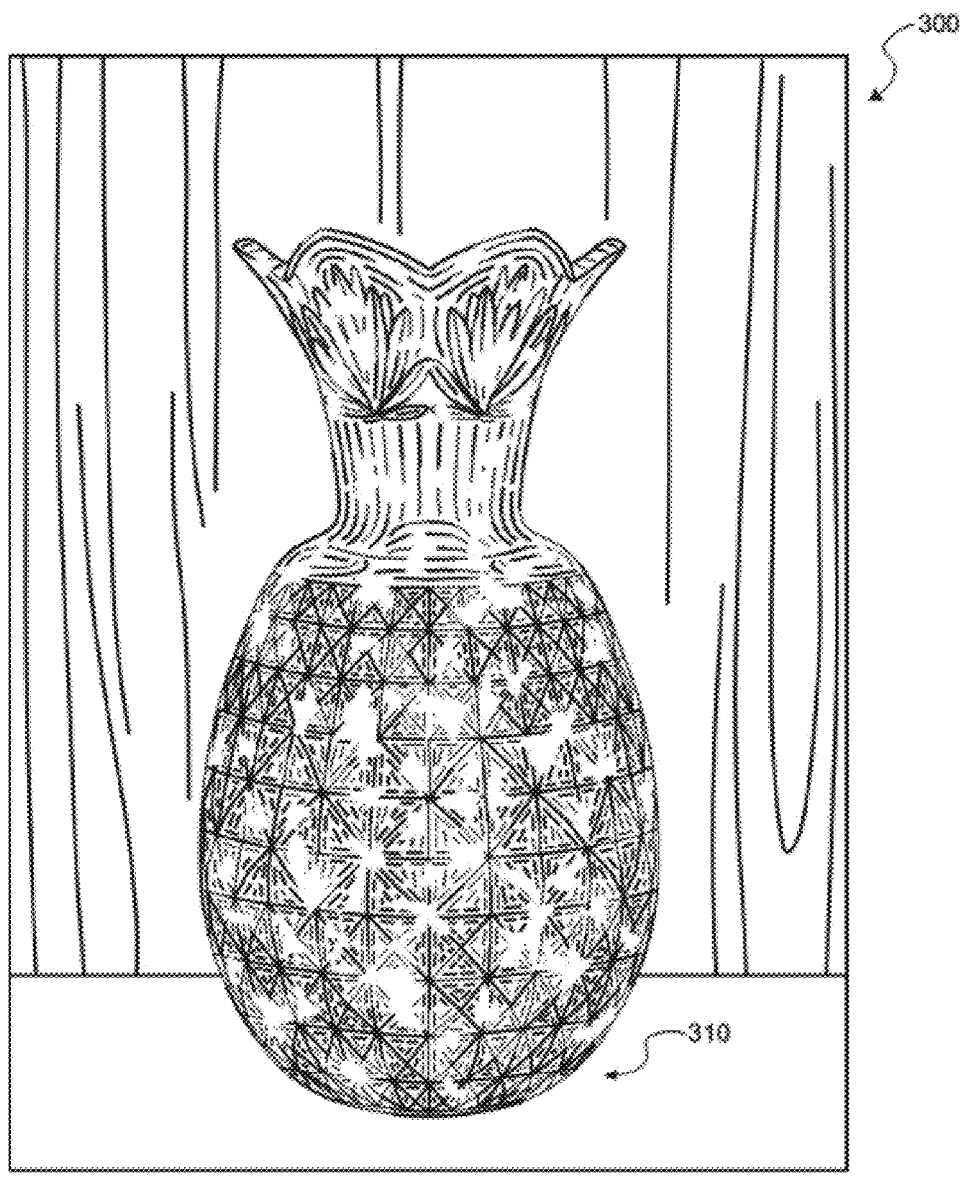
FIG. 3 is an example image of an object having specular highlights, used in some example embodiments.

Referring to FIG. 3, an example image 300 of an object 310 is shown that may benefit from being enhanced according to aspects of the present disclosures. Object 310 is used merely as one example, and example embodiments can certainly utilize other objects. Here, object 310 may be a glass or crystal vase resembling a pineapple. As with normal pineapples, object 310 contains many edges and grooves on its exterior, the likes of which reflect light in many directions when light is shined on it. Unfortunately, it may be difficult to fully appreciate how brilliantly light does shine off the many angled facets of the vase if the object 310 is displayed only as a single image. Accordingly, a merchant wishing to sell such a product may not feel that posting single pictures of the object 310 online will effectively capture its full value. Even showing multiple pictures of the object 310 from different sides may be inadequate, as the object 310—in this example being a pineapple vase—is relatively symmetric radially, and thus each side around the object 310 would not offer much different perspective. Furthermore, showing single static images would still fail to capture the full sparkle that the many edges and grooves of the object 310 is meant to show. In general, it should be understood that specular highlights of objects, such as the reflective properties of the many edges and grooves of the object 310, are not fully captured by a single static image, no matter how detailed the image.

Figure 4:
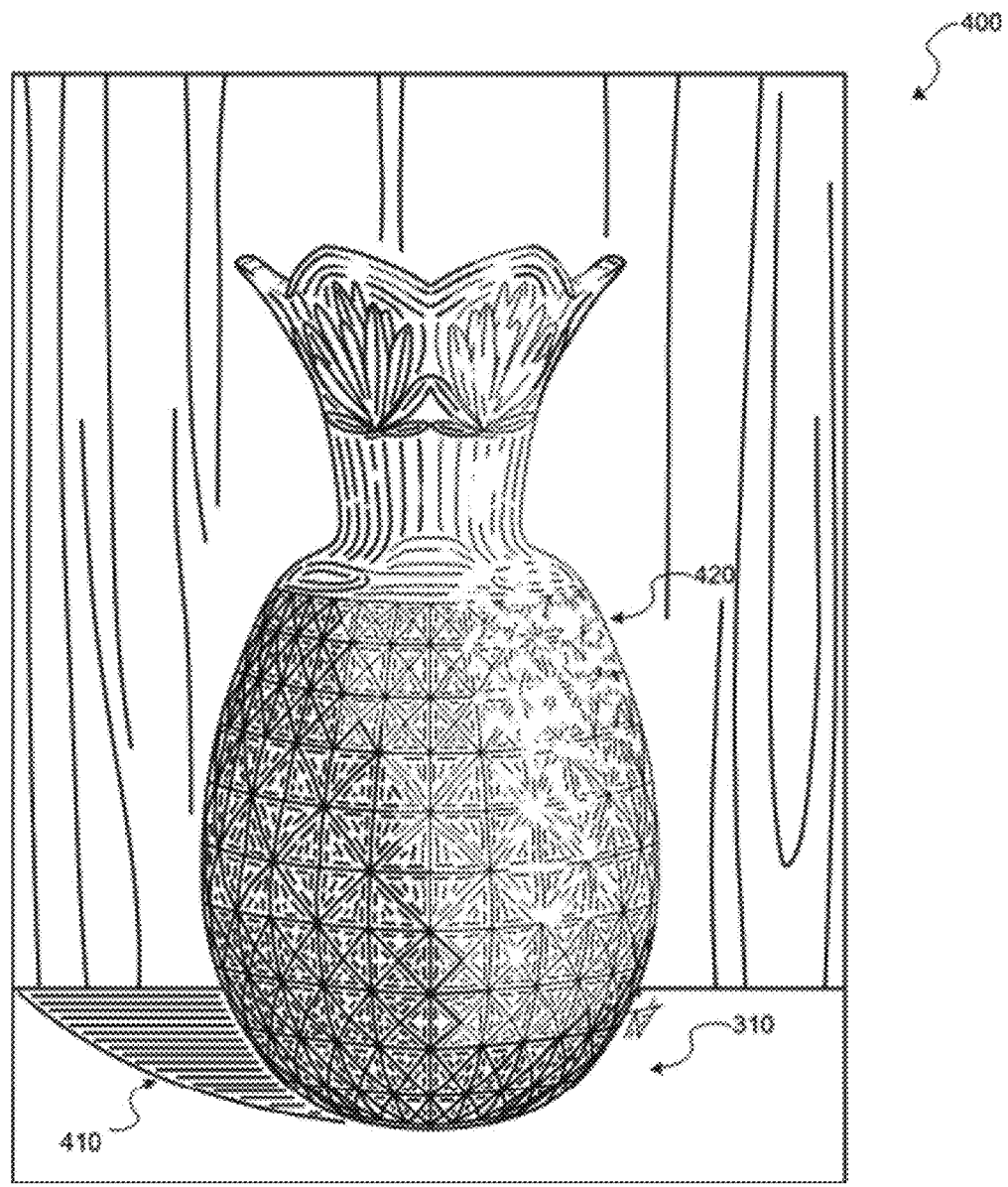
FIG. 4 is an example image of a first step in a process for recording objects having specular highlights, according to some example embodiments.

Referring to FIG. 4, example image 400 of object 310 shows the beginning of a process for enhancing the specular highlights according to aspects of the present disclosures. As discussed earlier, a composite image of the object 310 may be generated based on multiple images of the object 310 in the same position, but with light sources directed at the object 310 from different angles in each image. The composite image may ultimately be an interactive image of sorts, the interactive image configured to be manipulated in a display device to display varying light angles of the object 310 based on one or more of the multiple images and in accordance with a direction of a tilt of the display device. The example process may start with recording a first image of the object 310, the first image including light from a light source directed at the object 310 (e.g., the pineapple vase) from a first angle. In this case, a flash light in the upper right corner from the object 310, not shown, may be shining light at object 310. The angle of the light may be apparent based on the shadow formed by object 310 in the image 400 (e.g. shadow 410), and in some cases additionally based on the portion of the object 310 that is most brightly illuminated (e.g. bright spot 420).

As an example of a process for practicing at least some aspects of the present disclosure, a photographer may position a camera or mobile device housing a camera or other image recorder on a tripod or other stable apparatus. An example of a camera or mobile device may include the mobile device 100. The object 310 may be positioned fixedly on some stable surface, for example a steady stool or table. The camera may be positioned to record multiple images of the object 310. An application or other software program, according to some example embodiments, may direct the photographer to record an image of the object 310 with a light source directed at the object 310 from a particular angle, e.g., the light source directed from the top right of the object 310. For example, a user interface (UI) of an example application may appear on a display of a mobile device 100 and instruct the user to record an image of object 310 with a light source directed at the object 310 from a specific direction. The photographer may then position a light source, such as a flashlight, camera flash, flashbulb, focused light, or some other remote light source onto the object 310 from the specified direction, and record an image using the camera or mobile device 100. In some example embodiments, the mobile device used to record the image may be the same device that operates the application or software having the UI.

Figure 5:
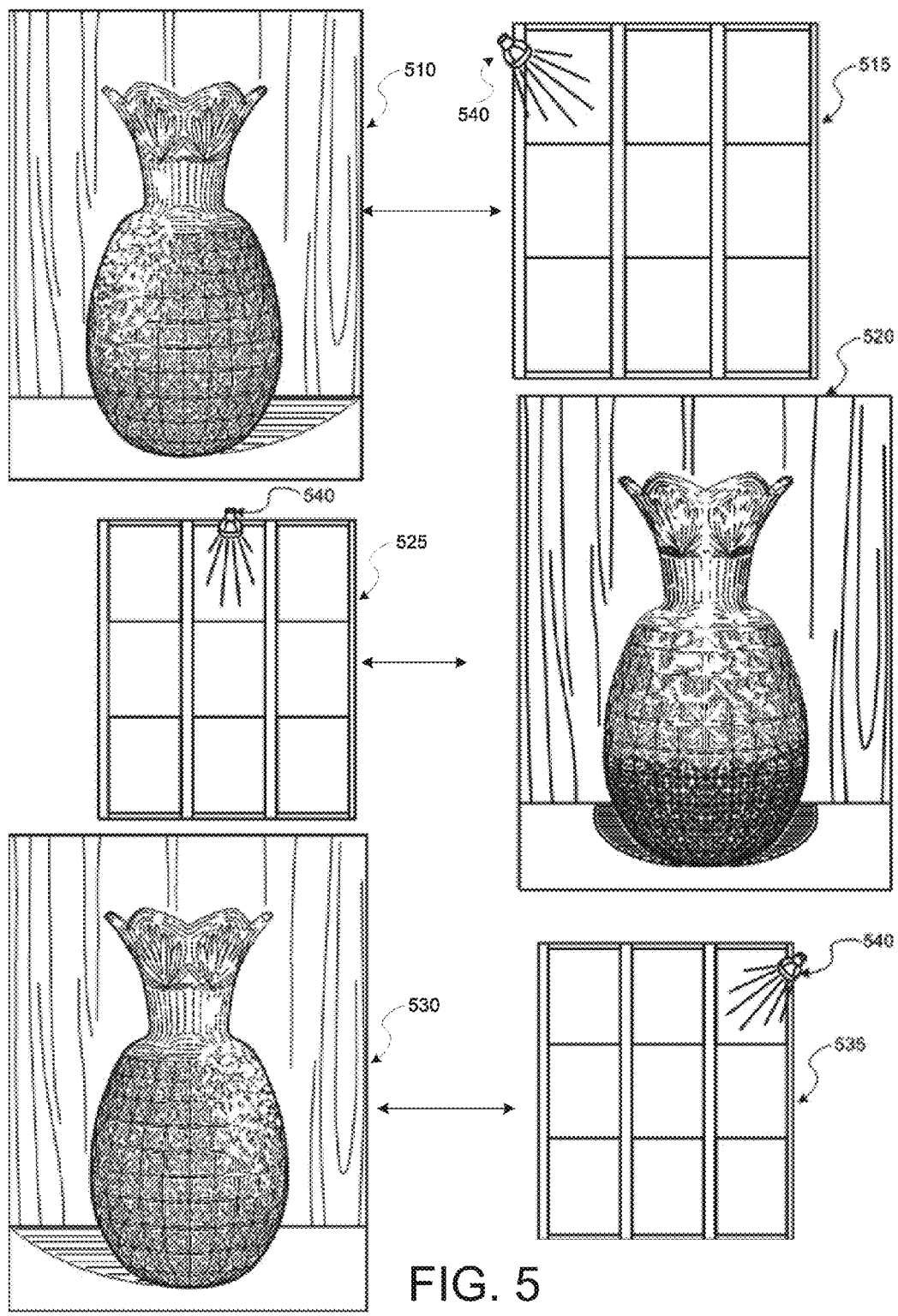
FIG. 5 illustrates example images of further steps in a process for recording objects having specular highlights, according to some example embodiments.

Referring to FIG. 5, example images 510, 520, and 530 show the continuation of an example process according to some example embodiments. For example, additional images 510, 520, and 530 of the object 310, e.g., the pineapple vase, may be recorded from the same position as the image 400 in FIG. 4. Each additional image 510, 520, and 530 may differ from each other in that a light source, not shown, is directed at the object 310 from a different angle in each image. For example, images 510, 520, and 530 show a shadow of the object 310 in different directions, indicating that a light source is being directed at the object 310 from different angles in each image 510, 520, and 530. In this case, rubrics 515, 525, and 535 each show a picture of a flashlight 540 indicating the direction that the light source is shining onto object 310 in each image 510, 520, and 530, respectively. Here, image 510 is recorded with a light source directed onto object 310 from the top left of object 310. Similarly, image 520 is recorded with a light source directed onto object 310 from above object 310. Lastly, image 530 is recorded with a light source directed onto object 310 from the top right of object 310. It may be apparent that these directions are in accordance with the flashlight directions shown in rubrics 515, 525, and 535, respectively. A mobile device or other digital device may store each of the images containing the object 310 and varying angles of directed light to be blended, or "stitched," together to form a composite image of the object 310, according to some example embodiments.

Figure 6A:
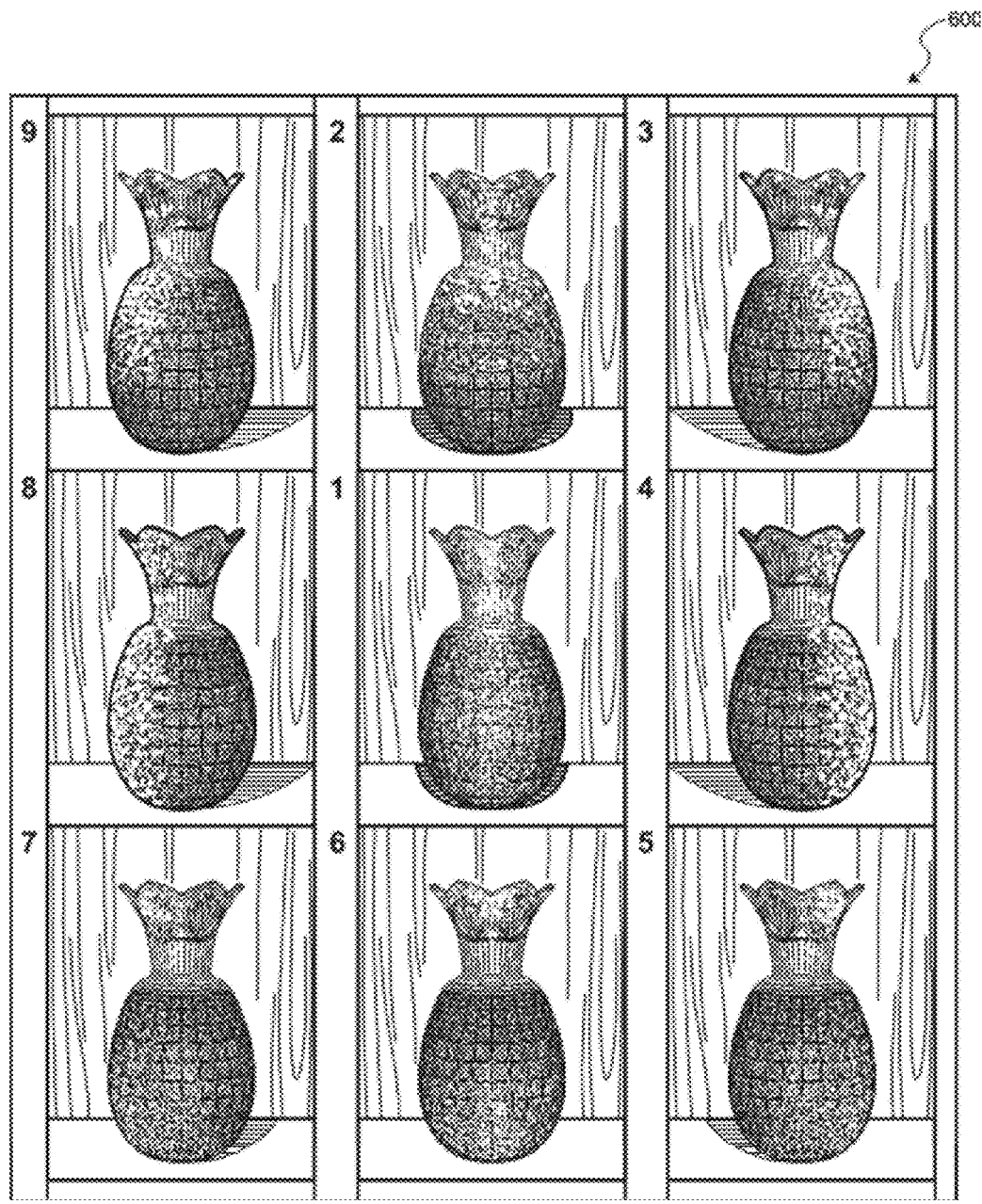
FIGS. 6A and 6B illustrate example images of yet further steps in a process for recording objects having specular highlights, according to some example embodiments.
Figure 6B:
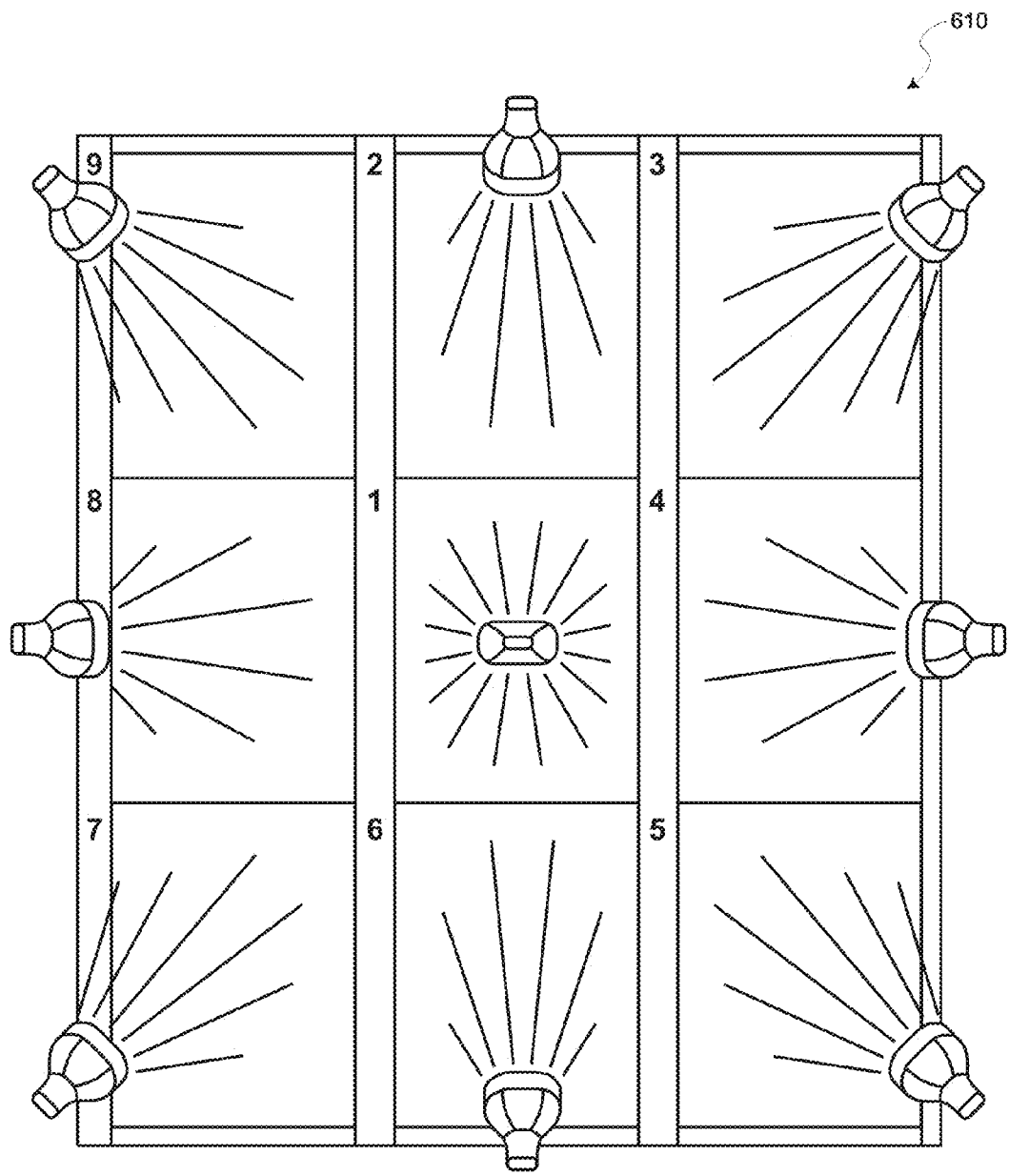

Referring to FIGS. 6A and 6B, following an extension of the progression from FIGS. 4 to 5, example comprehensive image 600 shows a more comprehensive set of images of the object 310, according to some example embodiments. Referring to FIG. 6A, an example comprehensive set of nine images of object 310 is shown, each image recording the object 310 at the same position but with a light source directed at the object 310 from a different angle in each image. Referring to FIG. 6B, each square in rubric 610 shows a flashlight icon that demonstrates the orientation of the light source directed at the object 310 in each corresponding image of comprehensive image 600 within the square at the same position in the rubric 610. As used herein, a "comprehensive set of images" may refer to a set of images that captures light sources directed at the object 310 from various angles around the object 310, e.g., 360 degrees in two dimensions, angles all around a semi-hemisphere centered around the object, etc., in a fairly even and/or uniform manner. In this case, eight images are used to capture light directed all around object 310, and in a ninth image, the light is directed straight at the object 310 from a neutral angle. In other cases, more or fewer images may be used, and embodiments are not so limited. For example, four or sixteen images may be used.

Adding further to the example process for practicing aspects of the present disclosure discussed starting in FIG. 4, in some example embodiments, the numbers in the corners of each square in the comprehensive image 600 and in rubric 610 may represent an order in which an application employing aspects of the present disclosure stores images of the object 310. For example, continuing with the example of an application having the UI, the UI may direct the photographer to take a particular number of photos of the object 310, with a light source directed at object 310 in a specific order for each photo. For example, as indicated by the number "1" in FIG. 6A, the UI may instruct the photographer to record a first picture in comprehensive image 600 as an image of the object 310 with the light source oriented directly straight ahead, e.g., at a neutral angle relative to the center of object 310. This image is the center image of comprehensive image 600. The photographer may record the picture using, e.g., mobile device 100, and the application may store that picture as the center picture. Next, as indicated by the number "2" in the top center image, the UI may instruct the photographer to record a second picture in comprehensive image 600 as an image of object 310 with the light oriented from the top of the object 310. The photographer may record the picture, and the application may store the second picture as a picture with the light source directed on top. Third, as indicated by the number "3" in the top right image, the application stores an image of object 310 with the light oriented from the top-right of the object 310, and so on following the numbers. In some cases, the application may direct the photographer to record each of these images in the order specified, and thereby stores the images in the order captured. Certainly, the order shown is merely one example, and other orders are clearly possible according to various embodiments. In other cases, a photographer may have previously recorded a series of images of the object 310 with different light angles, and may manually order the images in the application, whereby the application also receives an indication of which direction the light is coming from. The exact mechanics of this process can vary, and many others may be apparent to those with ordinary skill in the art. Any and all variants are within the scope of the present disclosures, and embodiments are not so limited.

Figure 7:
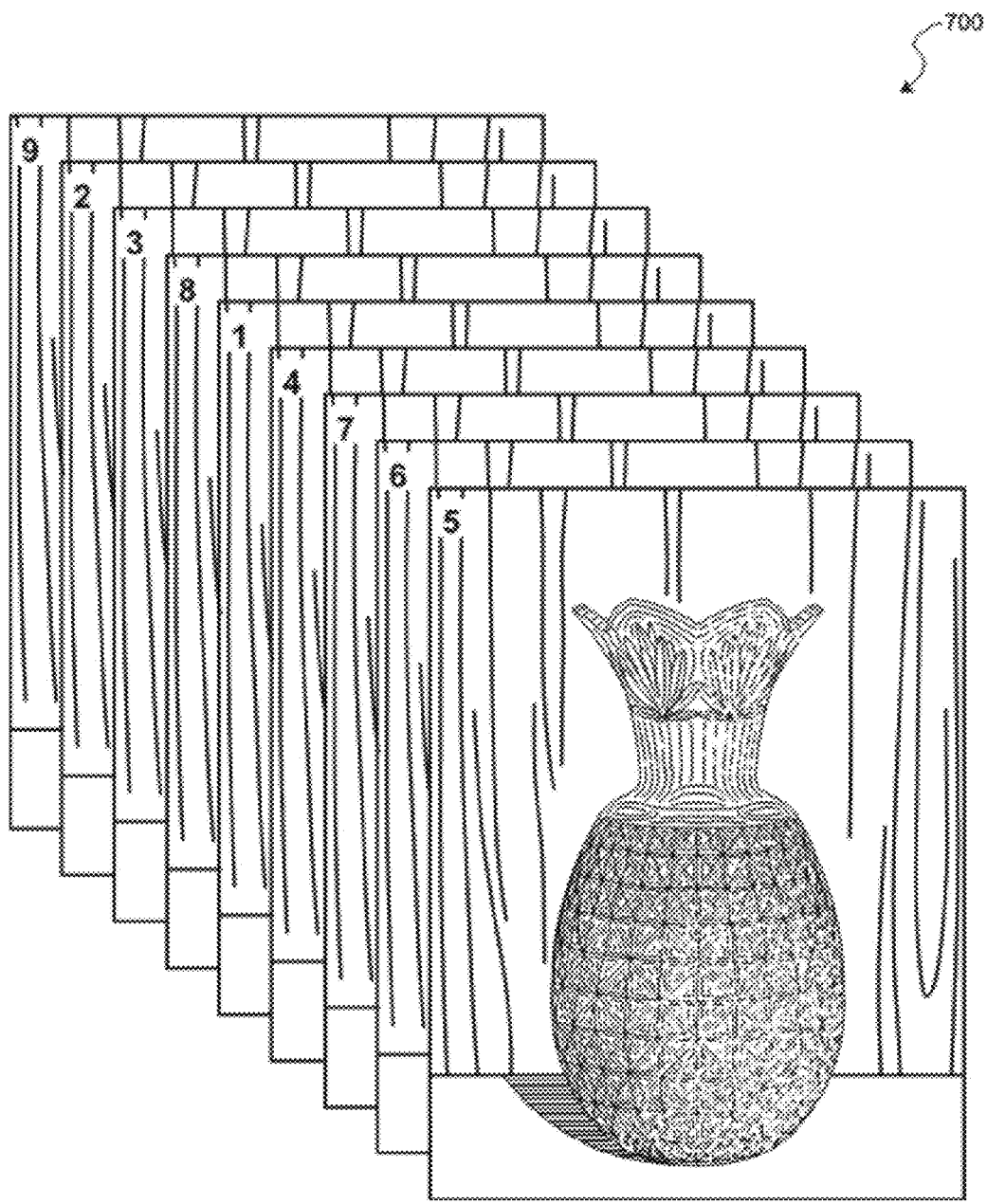
FIG. 7 illustrates example images of yet further steps in a process for recording objects having specular highlights, according to some example embodiments.

Referring to FIG. 7, having access to a comprehensive set of images showing light directed at varying angles of the object 310, a composite image of the object 310 may be generated according to aspects of the present disclosure. As used herein, a "composite image" may refer to an overlapping or superposition of the plurality of images in the comprehensive set of images, whereby a subset of the comprehensive set of images may be displayed with varying degrees of opaqueness based on a correspondence to a degree of tilt or orientation of the device displaying the composite image. The process of generating the composite image is represented by the cascading of the nine images in the comprehensive set of images, as illustrated in image 700. In this way, the "composite image" may be understood as not just a single image, but as a series of multiple images overlapping each other, each of the overlapping images configured to be modified with varying degrees of opaqueness (or transparency). In this example, the numbering of the cascading images as shown may signal an order in which the images are overlaid onto each other. In other example embodiments, such an ordering is not specified, and embodiments are not so limited.

As an example use case, with the composite image now generated, a viewer may utilize an application on a mobile device to view the composite image of the object 310. In some example embodiments, if a neutral angle of the composite image is defined as whatever orientation the viewing device starts at upon first displaying the composite image, then as the viewer rotates, turns, and/or tilts the viewing device, certain images within the comprehensive set of images will be made completely transparent (i.e., not viewable), while certain others may be shown with a degree of opaqueness, such that one or more images may be "blended" together. The determination for the degree of opaqueness (or conversely, transparency) of the nine images of the object 310 may depend on the degree of tilt, e.g., as expressed in two dimensions, from a neutral angle of the viewing device, e.g., the initial starting orientation of the viewing device.

As an example of "blending" multiple images of the composite image, say the viewer displays the object 310 in a viewing device, e.g., mobile device 100, starting with the viewing device flat on a table with the display screen facing up. The initial presentation of the object 310 may then be the center image of the object 310 as shown in the center image of image 600 (e.g., box #1), while all the other eight images are made completely transparent and are not viewable. The viewer can then tilt the viewing device, for example, raising only the right side of the viewing device so that the display screen is now facing slightly to the left. In some example embodiments, the composite image may be arranged such that the orientation of the light source shining on the displayed object is assumed to originate from the initial position of the viewer. Thus, here, by tilting the device slightly to the left, the application may now show an image of the object 310 with the light source oriented from the right side of the object 310 (e.g., the image in box #4 of image 600), while all the other eight images are made completely transparent and are not viewable. In other words, it will now appear to the viewer as if the light directed at the object 310 has come from the right, enabling the viewer to see how the light reflects differently off of the object 310. In some example embodiments, the gradual progression from orienting the viewing device in the initial neutral position to being tilted to the left (i.e., raising just the right side of the viewing device) may correspondingly involve a gradual change from viewing the center image (e.g., box #1 in image 600) to viewing the image with the light source oriented from the right side (e.g., box #4 in image 600). In general, the gradual progression from orienting the viewing device from a first tilted orientation to being tilted to a second tilted orientation may correspondingly involve a gradual change from viewing the object 310 based on a first set of blended images to viewing the object 310 based on a second set of blended images, the first set of blended images corresponding to the first tilted orientation, and the second set of blended images corresponding to the second tilted orientation.

For example, halfway between fully raising the right side of the viewing device, the center image of the object 310 may be set to 50% transparency, while the image with the light source oriented from the right side may also be set to 50% transparency. This may generate a sort of blended view of the two images that may represent what the object 310 may look like with the light source directed halfway between the center and fully from the right side. This blended view also corresponds to the degree of tilt of the viewing device. As another example, if the device is tilted just a quarter of the full tilt angle toward the left (e.g., the right side of the viewing device is tilted just a quarter of the full amount), then the center image of the object 310 may be shown at 75% opaqueness (e.g., 25% transparency), while the right image may overlap with the center image and be shown at 25% opaqueness (e.g., 75% transparency), thereby representing the proportional amount of the angle of the light source according to the degree of tilt of the viewing device. Similarly, the degree of transparency (or opaqueness) of each image may change smoothly and be made in accordance with the degree of tilt of the viewing device.

Figure 8A:
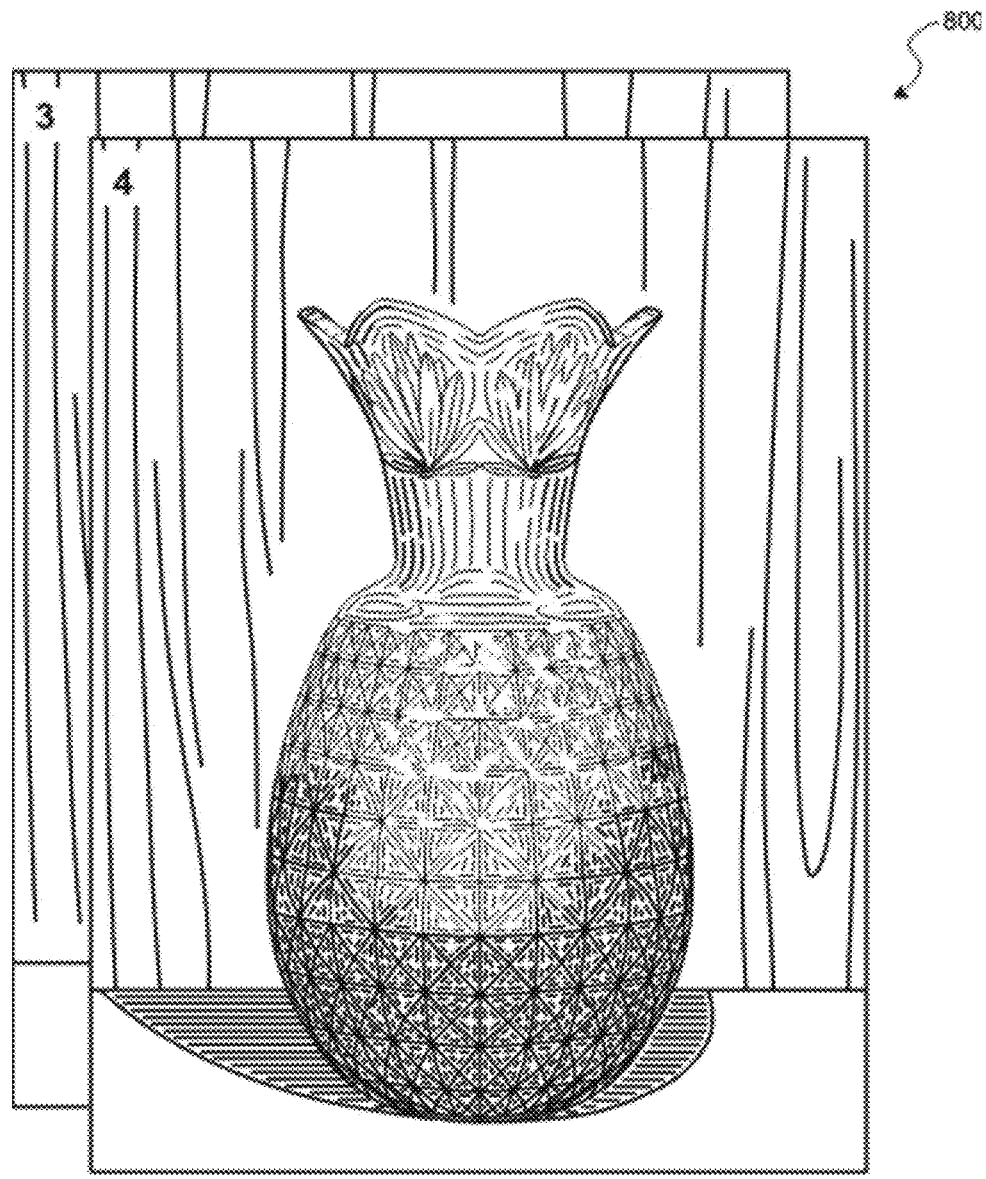
FIGS. 8A and 8B illustrate example images of viewing objects having specular highlights, according to some example embodiments.
Figure 8B:
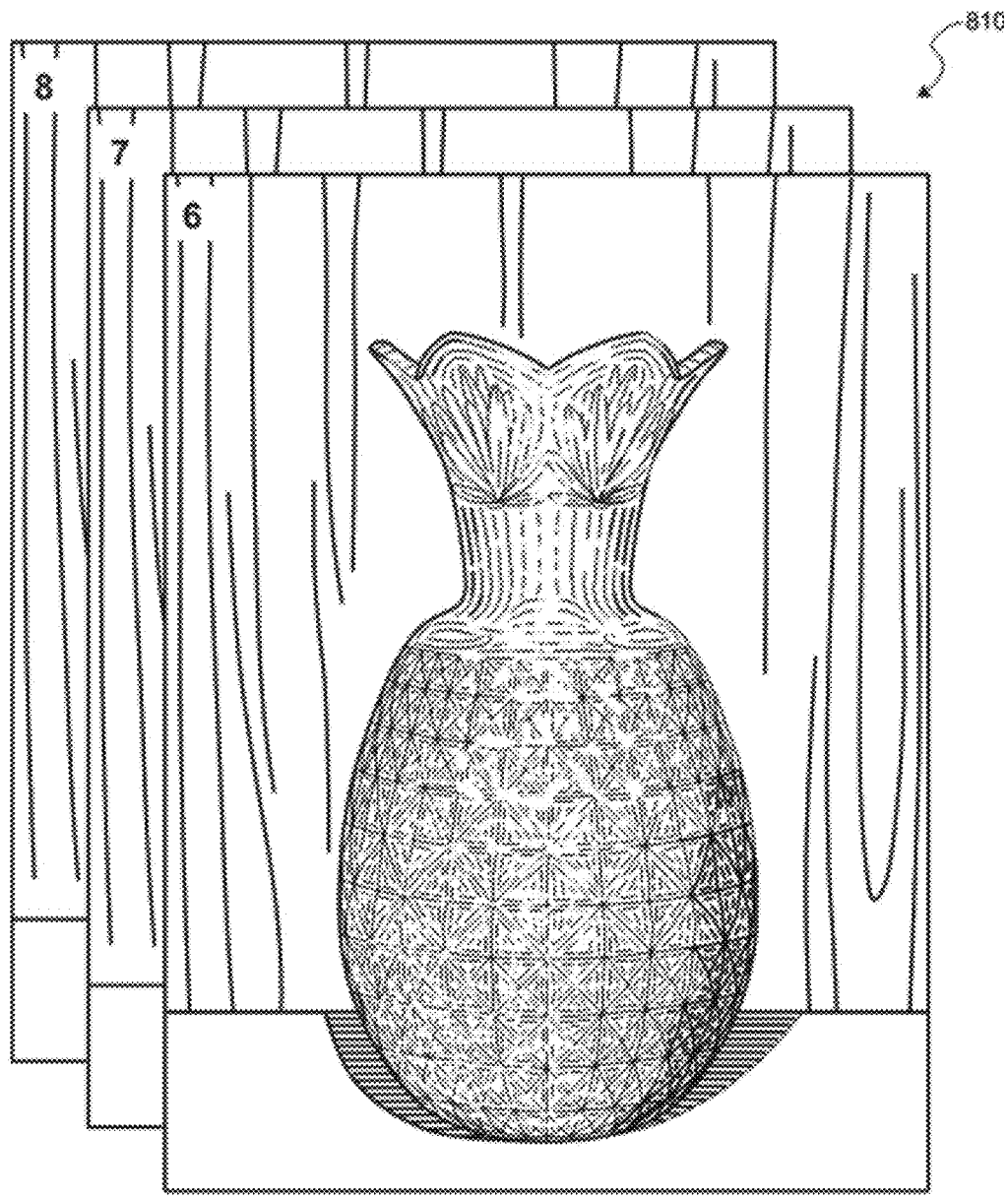

Referring to FIGS. 8A and 8B, two more examples illustrating the blending of the comprehensive set of images are shown in images 800 and 810, respectively. These two examples may illustrate slightly more complex situations. Referring to FIG. 8A and image 800, the "X" and "Y" values in the bottom right of image 800 may indicate length measurements, or in other cases, a percentage of the degree to which the viewing device has been tilted away from its horizontal and vertical axes. For example, the values "X=+0.75" and "Y=+0.50" may indicate that the viewing device has been tilted up from the right 75% of its full tilt view, and up from the top 50%, of its full tilt view. Accordingly, a blended image of the right-most image and the top-right image, e.g., images in boxes #3 and #4 in image 600, may be used to convey how light may shine off of object 310 at the specified tilt angle. In other cases, the center image may also be used, as the tilt may not be fully toward the top or the right.

Referring to FIG. 8B and image 810, similarly, the values "X=−0.793402" and "Y=0.13847" may indicate that the viewing device has been tilted down from the right (i.e., up from the left) ~79% of its full tilt view, and down from the top (i.e., up from the bottom) ~13% of its full tilt view. Accordingly, a blended image of the left-most image and the bottom-left image, e.g., images in boxes #7 and #8 in image 600, may be used to convey how light may shine off of object 310 at the specified tilt angle. In other cases, the center image may also be used, as the tilt may not be fully toward the top or the right. In other cases, the bottom image may also be used, as the tilt angle may also be considered to include part of the bottom image.

In general, a "stitching" or "blending" algorithm may be implemented to calculate the degree of transparency of each of the plurality of images based on a tilt input. For example, an algorithm to computing a view of the composite image based on a level of blending between the plurality of images in the comprehensive set of images may be based on computing a Euclidean distance. The Euclidean distance function may take in as parameters a difference between an initial orientation of the light source angle and the current tilt angle. In some example embodiments, the angles may be broken up into two dimensional components, such as an "X" direction and a "Y" direction. Other two dimensional coordinate systems may be used, of course, as well as other distance functions or even other methods for computing a view of the composite image based on a degree of tilt, as may be apparent to those with skill in the art, and embodiments are not so limited. In some example embodiments, a separate smoothing function may be employed to show a gradual change between an initial tilt orientation and a current tilt orientation. The smoothing function may interpolate the motion between the two orientations, and show a change in the light angles of the object 310 accordingly.

In general, aspects of the present disclosure may display varying numbers of the comprehensive set of images in the composite image, each in varying degrees of opaqueness (or transparency), based on a corresponding degree of tilt of the viewing device displaying the composite image of the object 310. As the orientation and degree of tilt changes, e.g., based on how the viewer rotates and tilts the device, the degrees of opaqueness for each image may correspondingly change as in the manners discussed herein. Thus, as the viewer tilts and rotates the device displaying the composite image, the viewer can get an interactive perspective of how the light reflects off of the object 310 from a multitude of different angles, as the composite image would be constantly changing in accordance with the changing tilts and/or rotations.

Aspects of the present disclosure therefore may help facilitate the presentation of objects with prominent specular properties, the likes of which may not otherwise be effectively conveyed through conventional means. In addition, unlike when trying to demonstrate specular properties through a video or other motion picture, the user has the freedom and control to examine the many specular properties of an object in at least two planar dimensions, rather than being limited to at most viewing a video of the object forwards or backwards.

While an actual picture of the object may not be recorded at every single nuanced angle (e.g., in examples, only nine images are used to generate all available viewing angles), the blended pictures create a simulated sense of what the object may look like in different lighting scenarios. The human mind generally finds this sufficient, as it is not usually able to distinguish between an exact image and an approximation between two or more similar-looking images. In other words, the human mind's treatment of reflecting light tends to be quite forgiving. Furthermore, the motion of changing viewpoints of light on the object is what tends to be noticed more by the human mind, and the exactness of static images from one to the next are not as important for realism's sake so much as the smoothness of the transition from one image to another.

In some example embodiments, displaying the right "blend" of images in the composite image may be based on an analogous input to a tilt angle, such as a mouse-controlled scrolling motion, or a mouse-controlled dragging motion of the composite image. For example, the tilt and rotation of the composite may also be displayed on a PC that does not possess any means for detecting tilt motions, such as gyroscopes, laser trackers or other positioning means. Instead, for example, the composite image can be "clicked and dragged," where a position of the mouse cursor on the image relative to its center may act as an analog to measuring a degree of tilt. Accordingly, the appropriate blend of images may be based on a corresponding position of the mouse cursor on the image relative to its center. As another example, two scroll bars, one positioned along the right of the composite image, and another positioned along the bottom of the composite image, may be scrolled back and forth as an analog to measuring a degree of tilt. As another example, the tilt may be simulated by a finger scroll or swipe along the display screen, whereby, for example, sliding a finger along the top end of the display may display a change in the light reflections on the object from the top angles, and so forth. Similarly, other means apparent to those with skill in the art may be employed to determine the proper blend of images in the composite image, and embodiments are not so limited. Thus, as used herein, reference to a degree of tilt or rotation according to various techniques of the present disclosure also includes analogous methods for devices without the ability to determine a degree of tilt or rotation.

In some example embodiments, multiple sides or faces of an object may also be connected together, with each side or face of the object itself being a composite image of overlapping images of that side or face recorded with different light angles. For example, the preceding images of the object 310 show only one side of the vase. An overhead or top-view of the object 310 is not shown, but could also be shown using the methods described herein. In other words, for example, nine images of a top-view of the object 310 could also be recorded, the nine images recorded in a similar fashion to those described in the presented disclosure (see, e.g., FIGS. 4, 5, 6A, 6B, and 7). Then, a composite image of the top-view of the object 310 may be generated.

In some embodiments, the different faces or sides of the object may be connected together to add an additional dimension to the viewing of the object. For example, a user of the viewer device may also be able to slide his finger down the display, across the face of the side image of the object 310. This may cause the image to scroll or flip to a top-view composite image of the object 310, at which point the user can tilt and rotate the viewer device to experience how light reflects off the top of the object 310. In some example embodiments, the scrolling from the side view to the top view may also be smoothly blended or stitched together, using known image connecting techniques similar to those used to stitch pictures to form a panoramic view. In other example embodiments, the multiple composite images showing different sides may not be so connected, and instead the user can just click or tap to the next composite image showing a different view of the object 310.

In some example embodiments, the direction of the blending between the multiple images may be inverted compared to the directions described above, and embodiments are not so limited. For example, the proportion of images blended according the example techniques described may be based on the degree of tilt made from the left and bottom of the viewer device, rather than from the right and the top. In general, the exact direction and/or degree of the blending of images may be based on different orientations or degrees of the tilt or rotations, and embodiments are not so limited.

Figure 9:
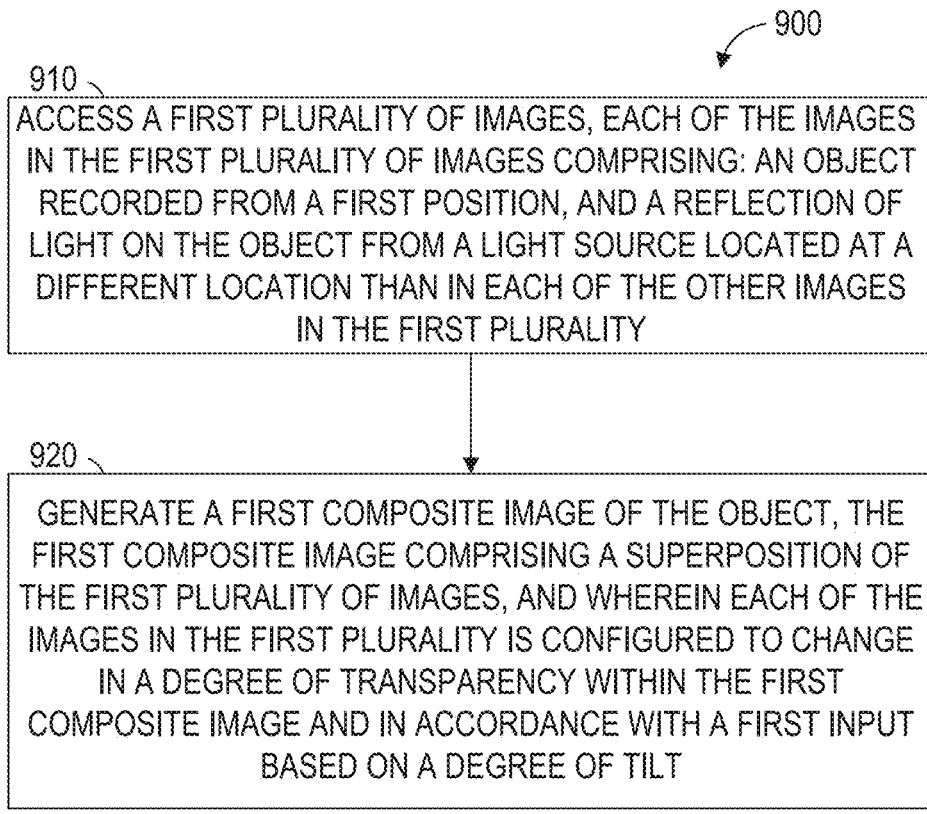
FIG. 9 is a flowchart illustrating example operations for generating a composite image of an object, according to some example embodiments.

Referring to FIG. 9, example flowchart 900 illustrates an example methodology for generating a composite image of an object. The example methodology may be consistent with the methods described herein, including, for example, the descriptions in FIGS. 3, 4, 5, 6A, 6B, 7, 8A, and 8B. At block 910, a device, such as the mobile device 100 as described in FIG. 1, may access a first plurality of images, each of the images in the first plurality of images comprising: an object (such as object 310 of FIG. 3) recorded from a first position, and a reflection of light on the object from a light source located at a different location than in each of the other images in the first plurality. The first plurality of images may be recorded according to the methods described herein, including, for example, descriptions in FIGS. 4, 5, 6A, and 6B. For example, the device may be stabilized in a certain position and record the first plurality of objects with a light source shining on the object from different locations in each of the first plurality of images. The images may be stored in the device, or in other cases may be stored in a remote server, such as a cloud server, via a network. In some cases, the device may be a remote server, and the images may be accessed from a mobile device that recorded the images.

At block 920, the device may generate a first composite image of the object, the first composite image comprising a superposition of the first plurality of images, and wherein each of the images in the first plurality is configured to change in a degree of transparency within the first composite image and in accordance with a first input based on a degree of tilt. The composite image may be consistent with descriptions of the composite image discussed herein, for example, in FIGS. 4, 5, 6A, 6B 7, 8A, and 8B. The composite image may be stored in the device. In other cases, the composite image may be stored in a remote server, such as a cloud server. After generating the composite image, in some example embodiments, the composite may be transmitted to a viewer device separate from the device that generated the composite image. In other cases, the device that generated the composite image may be the same as the viewer device.

In some example embodiments, the change in the degree of transparency of each of the images in the first plurality is further in accordance with a direction of the location of the light source relative to the object in each of the images in the first plurality. In some example embodiments, the change in the degree of transparency of each of the images in the first plurality is based on a correspondence between the degree of tilt and a direction of the location of the light source relative to the object in each of the images in the first plurality. In some example embodiments, the change in the degree of transparency of each of the images in the first plurality is based on tilt calculations from a stitching algorithm. These descriptions may be consistent with the descriptions discussed throughout the disclosures, for example, in FIGS. 4, 5, 6A, 6B 7, 8A, and 8B.

In some example embodiments, the first input based on the degree of tilt includes a measurement from an accelerometer or gyroscope in a display device configured to display the first composite image. For example, the display device may measure the degree of tilt of the device by a user, based on readings from one or more accelerometers or gyroscopes in the display device. In some example embodiments, the first input based on the degree of tilt comprises touch data from a display screen of a device configured to display the first composite image. For example, the degree of tilt may be based on readings of finger swipes on a capacitive touch screen displaying the composite image. In some example embodiments, the first input based on the degree of tilt comprises data from a mouse scroll. For example, a click-and-drag input coupled with a movement of a mouse cursor may simulate a tilt angle, and the degree of transparency in each of the images may change in accordance with the location of the mouse movements. These descriptions may be consistent with the descriptions discussed throughout the disclosures, for example, in FIGS. 4, 5, 6A, 6B 7, 8A, and 8B.

In some example embodiments, a second composite image of the object, recorded from a different position so as to have recorded a different side of the object, may be connected together with the first composite image via a sort of smoothing graphical connection. The second composite image may be generated through similar means as the first composite image, but from a different position showing a different side of the object. A graphical connection between the first composite image and the second composite image may be generated, wherein a display of the first composite image is configured to transition to a display of the second composite image, the transition being based on the graphical connection between the first composite image and the second composite image. These descriptions may be consistent with the descriptions discussed throughout the disclosures, for example, in FIGS. 4, 5, 6A, 6B 7, 8A, and 8B.

Figure 10:
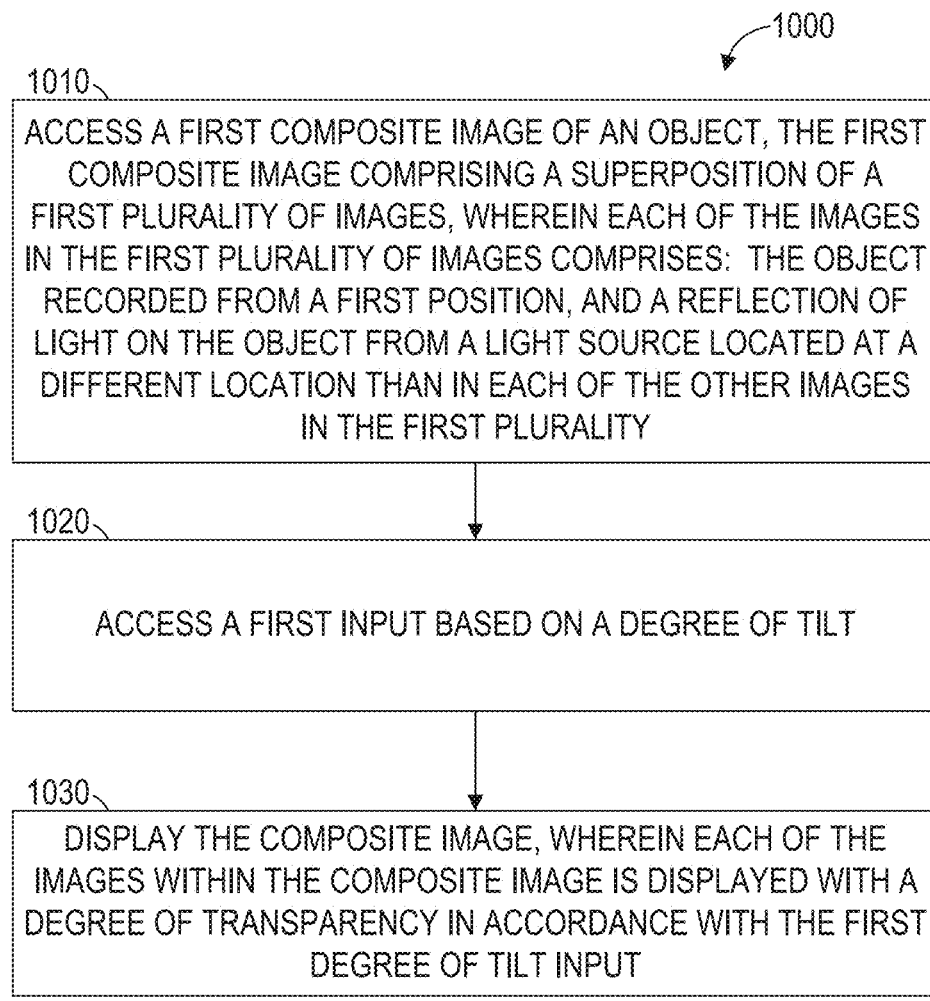
FIG. 10 is a flowchart illustrating example operations for viewing a composite image of an object, according to some example embodiments.

Referring to FIG. 10, a flowchart 1000 illustrates a counterpart methodology to the methodology described in FIG. 9, but in this case related to accessing and viewing the composite image. The methods described here may be implemented by a display device that has accessed or stored the composite image. The display device may be a different device than the device used to record the plurality of images. In other cases, the display device may be the same as the device used to record the plurality of images. In some cases, the display device may also generate the composite image but may not have recorded the plurality of images.

At block 1010, a display device may access a first composite image of an object (such as object 310), the first composite image comprising a superposition of a first plurality of images, wherein each of the images in the first plurality of images comprises: the object recorded from a first position, and a reflection of light on the object from a light source located at a different location than in each of the other images in the first plurality. At block 1020, the display device may access a first input based on a degree of tilt. As mentioned before, the degree of tilt may be based on a number of different input means, including, for example, data from a gyroscope, accelerometer, touch data, or mouse input, which can include analogs to tilt data as described above. At block 1030, the display device may display the composite image, wherein each of the images within the composite image is displayed with a degree of transparency in accordance with the first degree of tilt input. For example, some of the images may be completely transparent, while a few images may have a non-zero degree of opaqueness that corresponds to a calculated angle at which the viewer wishes to view the object, based on the accessed tilt input. In general, the methods described here may be consistent with the methods described throughout the disclosures, including, for example, the descriptions in FIGS. 4, 5, 6A, 6B 7, 8A, and 8B.

In some example embodiments, similar to the methods for generating the composite image, a second composite image may be graphically connected with the first composite image, and the viewer may enter a second input to scroll smoothly between the first and second composite images.

Figure 11:
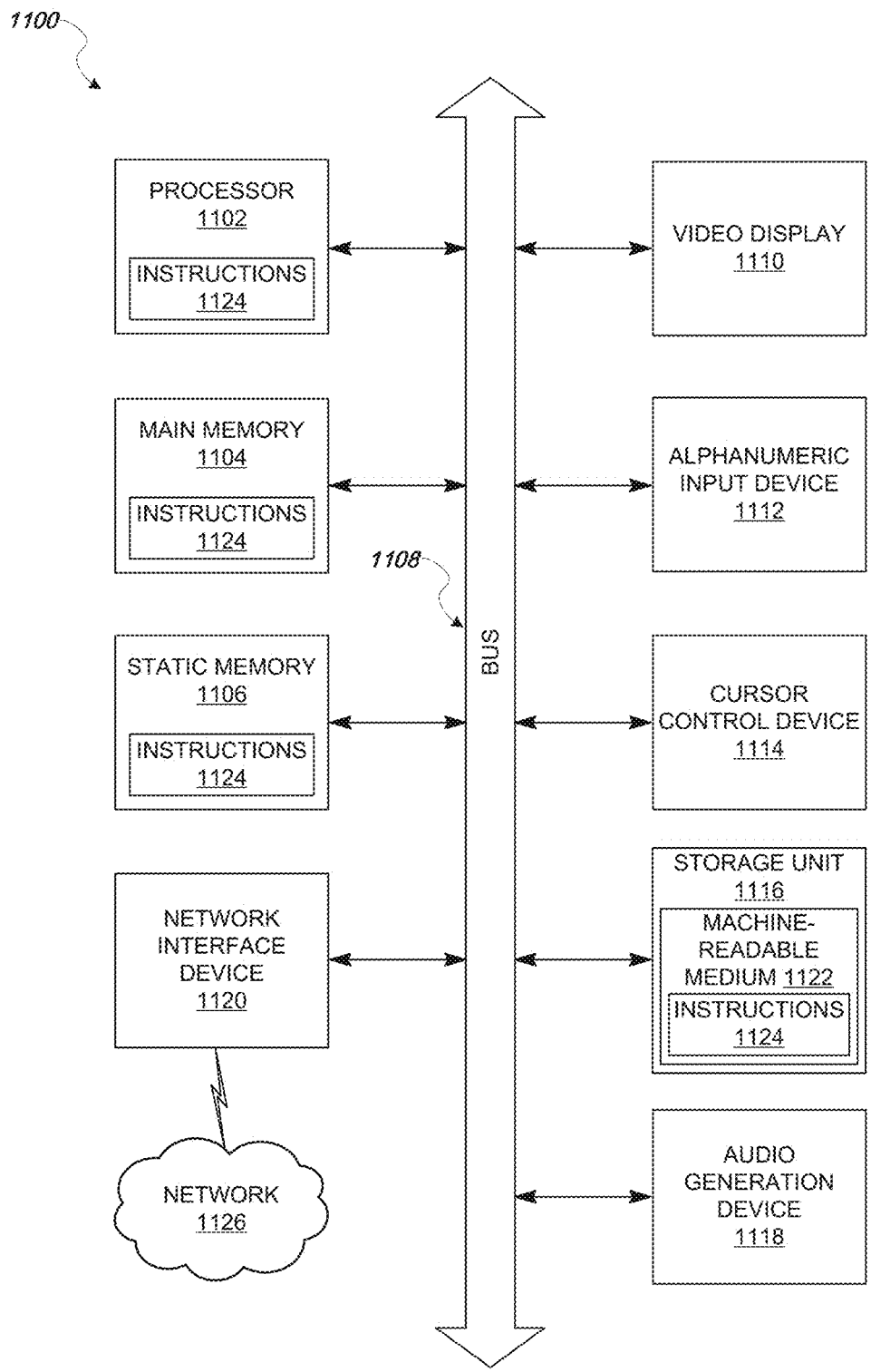
FIG. 11 is a block diagram illustrating components of a machine, according to some example embodiments, able to read instructions from a machine-readable medium and perform any one or more of the methodologies discussed herein.

Referring to FIG. 11, the block diagram illustrates components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may include hardware, software, or combinations thereof, and may as examples be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a video display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, an audio generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein, including, for example, any of the descriptions of FIGS. 1, 2, 3, 4, 5, 6A, 6B, 7, 8A, 8B, 9, and/or 10. The instructions 1124 may also reside, completely or at least partially, within the main memory 1104, within the processor 1102 (e.g., within the processor's cache memory), or both, before or during execution thereof by the machine 1100. The instructions may also reside in the static memory 1106.

Accordingly, the main memory 1104 and the processor 1102 may be considered machine-readable media (e.g., tangible and non-transitory machine-readable media). The instructions 1124 may be transmitted or received over a network 1126 via the network interface device 1120. For example, the network interface device 1120 may communicate the instructions 1124 using any one or more transfer protocols (e.g., hypertext transfer protocol (HTTP)). The machine 1100 may also represent example means for performing any of the functions described herein, including the processes described in FIGS. 1, 2, 3, 4, 5, 6A, 6B, 7, 8A, 8B, 9, and/or 10.

In some example embodiments, the machine 1100 may be a portable computing device, such as a smart phone or tablet computer, and have one or more additional input components (e.g., sensors or gauges), not shown. Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer implemented method comprising:
    accessing a first plurality of images, each of the images in the first plurality of images comprising: an object recorded from a first position, and a reflection of light on the object from a light source located at a different location than in each of the other images in the first plurality of images;
    generating a first composite image of the object, the first composite image comprising a superposition of the first plurality of images, and wherein each of the images in the first plurality of images is configured to change in a degree of transparency within the first composite image and in accordance with a first input based on a degree of tilt; and
    adjusting the degree of transparency for each of the first plurality of images in response to a user input to present an interactive perspective of light reflections from the object.

2. The method of claim 1, wherein the change in the degree of transparency of each of the images in the first plurality of images is based on a correspondence between the degree of tilt and a direction of a location of the light source relative to the object in each of the images in the first plurality of images.

3. The method of claim 1, wherein the change in the degree of transparency of each of the images in the first plurality of images is based on tilt calculations from a stitching algorithm.

4. The method of claim 1, wherein the first input based on the degree of tilt comprises a measurement from an accelerometer and/or gyroscope in a display device configured to display the first composite image.

5. The method of claim 1, wherein the first input based on the degree of tilt comprises touch data from a display screen of a device configured to display the first composite image.

6. The method of claim 1, wherein the first input based on the degree of tilt comprises data from a mouse scroll.

7. The method of claim 1, further comprising:
    accessing a second plurality of images, each of the images in the second plurality of images comprising:
        the object recorded from a second position, and
        a reflection of light on the object from a light source located at a different location than in each of the other second plurality of images;
    generating a second composite image of the object, the second composite image comprising a superposition of the second plurality of images, and wherein each image of the second plurality of images is configured to change in a degree of transparency within the second composite image and in accordance with a second input based on a degree of tilt; and generating a graphical connection between the first composite image and the second composite image, wherein a display of the first composite image is configured to transition to a display of the second composite image, the transition based on the graphical connection between the first composite image and the second composite image.

8. A system comprising:

a first memory configured to store a first plurality of image;

one or more processors coupled to the memory and configured to:

access the first plurality of images, each of the images in the first plurality of images comprising: an object recorded from a first position, and a reflection of light on the object from a light source located at a different location than in each of the other images in the first plurality of images;

generate a first composite image of the object, the first composite image comprising a superposition of the first plurality of images, and wherein each of the images in the first plurality of images is configured to change in a degree of transparency within the first composite image and in accordance with a first input based on a degree of tilt; and adjust the degree of transparency for each of the first plurality of images in response to a user input to present an interactive perspective of light reflections from the object.

9. The system of claim 8, wherein the change in the degree of transparency of each of the images in the first plurality of images is further in accordance with a direction of a location of the light source relative to the object in each of the images in the first plurality of images.

10. The system of claim 8, wherein the change in the degree of transparency of each of the images in the first plurality of images is based on a correspondence between the degree of tilt and a direction of a location of the light source relative to the object in each of the images in the first plurality.

11. The system of claim 8, wherein the change in the degree of transparency of each of the images in the first plurality of images is based on tilt calculations from a stitching algorithm.

12. The system of claim 8, wherein the first input based on the degree of tilt comprises a measurement from an accelerometer and/or gyroscope in a display device configured to display the first composite image.

13. The system of claim 8, wherein the first input based on the degree of tilt comprises touch data from a display screen of a device configured to display the first composite image.

14. The system of claim 8, wherein the first input based on the degree of tilt comprises data from a mouse scroll.

15. The system of claim 8, wherein the processor is further configured to:

access a second plurality of images, each of the images in the second plurality of images comprising:

the object recorded from a second position, and a reflection of light on the object from a light source located at a different location than in each of the other second plurality of images;

generate a second composite image of the object, the second composite image comprising a superposition of the second plurality of images, and wherein each of the second plurality of images is configured to change in a degree of transparency within the second composite image and in accordance with a second input based on a degree of tilt; and generate a graphical connection between the first composite image and the second composite image, wherein a display of the first composite image is configured to transition to a display of the second composite image, the transition based on the graphical connection between the first composite image and the second composite image.

16. A non-transitory computer-readable medium embodying instructions that, when executed by a processor, perform operations comprising:

accessing a first plurality of images, each of the images in the first plurality of images comprising: an object recorded from a first position, and a reflection of light on the object from a light source located at a different location than in each of the other images in the first plurality of images;

generating a first composite image of the object, the first composite image comprising a superposition of the first plurality of images, and wherein each of the images in the first plurality of images is configured to change in a degree of transparency within the first composite image and in accordance with a first input based on a degree of tilt; and adjusting the degree of transparency for each of the first plurality of images in response to a user input to present an interactive perspective of light reflections from the object.

17. The non-transitory computer-readable medium of claim 16, wherein the change in the degree of transparency of each of the images in the first plurality of images is further in accordance with a direction of a location of the light source relative to the object in each of the images in the first plurality of images.

18. The non-transitory computer-readable medium of claim 16, wherein the change in the degree of transparency of each of the images in the first plurality of images is based on a correspondence between the degree of tilt and a direction of the location of the light source relative to the object in each of the images in the first plurality of images.

19. The non-transitory computer-readable medium of claim 16, wherein the change in the degree of transparency of each of the images in the first plurality of images is based on tilt calculations from a stitching algorithm.

* * * * *